US007211022B2

(12) United States Patent
Tiesler et al.

(10) Patent No.: US 7,211,022 B2

(45) Date of Patent: May 1, 2007

(54) AUTOMATIC TRANSMISSION

(75) Inventors: Peter Tiesler, Meckenbeuren (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 186 days.

(21) Appl. No.: 11/128,048

(22) Filed: May 12, 2005

(65) Prior Publication Data

US 2005/0255958 A1 Nov. 17, 2005

(30) Foreign Application Priority Data

May 14, 2004 (DE) ...................... 10 2004 023 960

(51) Int. Cl.
*F16H 3/62* (2006.01)

(52) U.S. Cl. ...................................................... 475/275

(58) Field of Classification Search ......... 475/275–279
See application file for complete search history.

(56) References Cited

U.S. PATENT DOCUMENTS

| | | | | |
|---|---|---|---|---|
| 4,395,925 | A | 8/1983 | Gaus | |
| 5,106,352 | A | 4/1992 | Lepelletier | |
| 5,295,924 | A | 3/1994 | Beim | |
| 5,342,257 | A | 8/1994 | Hotta et al. | |
| 5,435,792 | A | 7/1995 | Justice et al. | |
| 5,455,767 | A | 10/1995 | Staerker | |
| 5,514,050 | A | 5/1996 | Bäuerle et al. | |
| 5,913,746 | A | 6/1999 | Bäuerle | |
| 6,053,839 | A | 4/2000 | Baldwin et al. | |
| 6,083,135 | A | 7/2000 | Baldwin et al. | |
| 6,139,463 | A | 10/2000 | Kasuya et al. | |
| 6,217,474 | B1 | 4/2001 | Ross et al. | |
| 6,425,841 | B1 | 7/2002 | Haka | |
| 6,558,287 | B2 * | 5/2003 | Hayabuchi et al. | 475/271 |
| 6,572,507 | B1 | 6/2003 | Korkmaz et al. | |

(Continued)

FOREIGN PATENT DOCUMENTS

DE 29 36 969 A1 4/1981

(Continued)

OTHER PUBLICATIONS

Tenberge, Prof. Dr. P., "E-Automat Automatikgetriebe mit Esprit", *VDI-Berichte*, Nr. 1610, VDI Verlag GmbH-Düsseldorf, Germany, Jun. 20, 2001, pp. 455-479.

*Primary Examiner*—Ha Ho
(74) *Attorney, Agent, or Firm*—Davis Bujold & Daniels, P.L.L.C.

(57) ABSTRACT

A multi-step reduction gear with forward reverse gears comprising a drive shaft, a power take-off shaft, three planet sets, rotating shafts as well as six switch elements. The drive shaft is connected with the sun gear of the planetary set and can be connected to the shaft, which is connected to the carrier of the second planetary set and the carrier of the third planetary set. The power take-off shaft is connected with the ring gear of two of the planetary sets, the shaft connected to the carrier of the planetary set to a housing and across the clutches with the shafts is detachably connected. The shaft connected with the shaft of one of the ring gears of the planetary set and is connected with the sun gear of the planetary set and the shaft with the sun gear of the planetary set can be linked to the housing.

25 Claims, 3 Drawing Sheets

U.S. PATENT DOCUMENTS

| | | | |
|---|---|---|---|
| 6,634,980 B1 | 10/2003 | Ziemer | |
| 6,723,018 B2 | 4/2004 | Hayabuchi et al. | |
| 6,860,831 B2 | 3/2005 | Ziemer | |
| 2003/0054917 A1 | 3/2003 | Raghavan et al. | |
| 2003/0083174 A1 | 5/2003 | Tabata et al. | |
| 2003/0203784 A1 | 10/2003 | Usoro et al. | |
| 2004/0097324 A1 | 5/2004 | Ziemer | |
| 2006/0068965 A1* | 3/2006 | Gumpoltsberger | 475/275 |
| 2006/0178243 A1* | 8/2006 | Usoro et al. | 475/276 |

FOREIGN PATENT DOCUMENTS

| | | | |
|---|---|---|---|
| DE | 689 07 338 | T2 | 11/1993 |
| DE | 43 30 391 | A1 | 10/1994 |
| DE | 691 16 480 | T2 | 6/1996 |
| DE | 196 10 950 | A1 | 9/1997 |
| DE | 199 12 480 | A1 | 9/2000 |
| DE | 199 49 507 | A1 | 4/2001 |
| DE | 100 43 751 | A1 | 6/2001 |
| DE | 102 00 379 | A1 | 8/2002 |
| DE | 101 15 983 | A1 | 10/2002 |
| DE | 101 15 987 | A1 | 10/2002 |
| DE | 102 13 820 | A1 | 10/2002 |
| DE | 102 50 374 | A1 | 6/2003 |
| DE | 102 31 350 | A1 | 1/2004 |
| EP | 0 434 525 | A1 | 6/1991 |
| EP | 0 531 567 | A1 | 3/1993 |
| EP | 0 378 900 | B1 | 6/1993 |
| EP | 1 411 269 | A2 | 4/2004 |
| GB | 1 522 616 | | 8/1978 |
| JP | 04119245 | A | 4/1992 |
| JP | 2000234664 | | 8/2000 |
| JP | 2000291747 | A | 10/2000 |
| JP | 2001082555 | A | 3/2001 |
| JP | 2002323098 | A | 11/2002 |
| WO | WO-02/079670 | A2 | 10/2002 |
| WO | WO-02/079671 | A2 | 10/2002 |
| WO | WO-03094865 | A1 | 11/2003 |

* cited by examiner

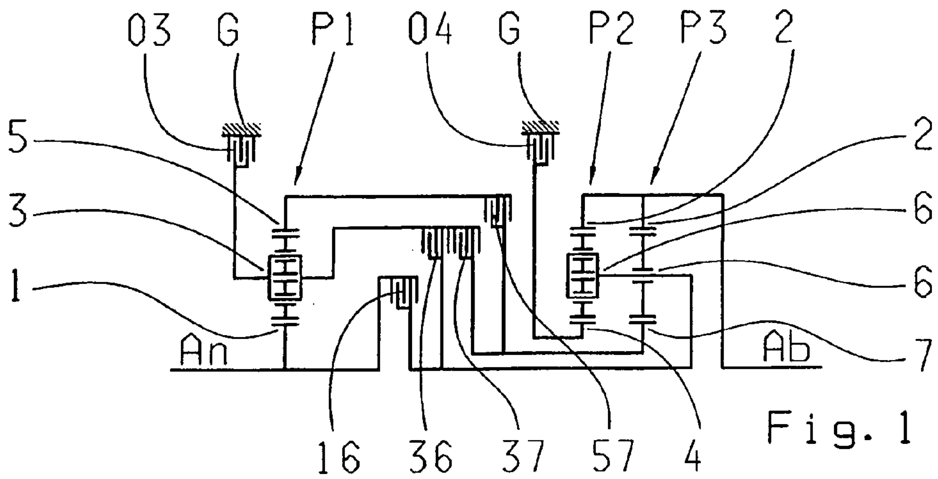
Fig. 1
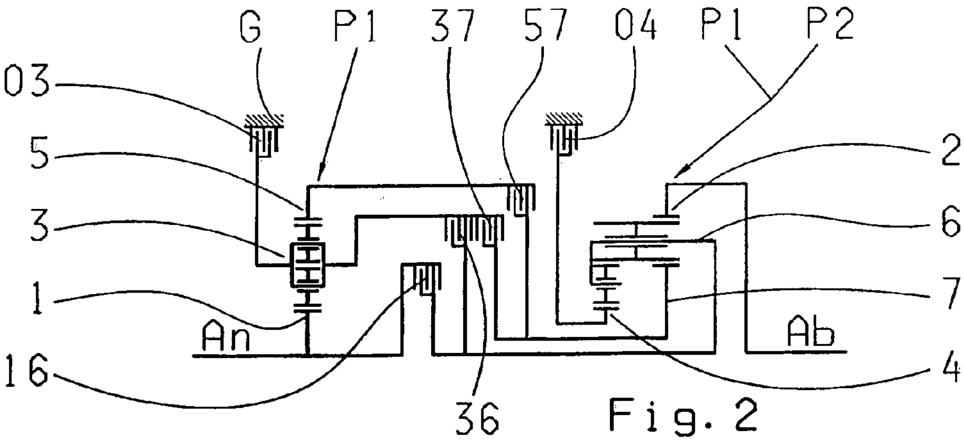
Fig. 2
| | B03 | B04 | K16 | K36 | K37 | K57 | i | φ |
|---|---|---|---|---|---|---|---|---|
| 1. | • | • | | | | • | 5,74 | 1,64 |
| 2. | | • | | • | | • | 3,50 | 1,57 |
| 3. | | • | | | • | • | 2,24 | 1,57 |
| 4. | | • | • | | • | | 1,43 | 1,43 |
| 5. | | | • | | • | • | 1,00 | 1,32 |
| 6. | • | | • | | | • | 0,76 | 1,16 |
| 7. | • | | • | | • | | 0,66 | -0,85 |
| R1. | • | | | • | | • | -4,88 | |
Fig. 3

AUTOMATIC TRANSMISSION

This application claims priority from German Application Serial No. 10 2004 023 960.6 filed May 14, 2004.

FIELD OF THE INVENTION

The submitted invention concerns a multistage reduction gear of planetary construction, specifically, an automatic transmission for a motor vehicle.

BACKGROUND OF THE INVENTION

Automatic transmissions, particularly those for motor vehicles, cover planetary assemblies, which are switched by way of friction and/or control elements, such as clutches and brakes, and generally are equipped by choice with a bridging clutch with a starting element and linked to an underlying slip effect, such as a hydrodynamic torque converter or a Foettinger coupling.

Such transmission is based on an EP 0 434 525 A1. It basically consists of a drive shaft and an output shaft, which are arranged parallel to each other; one concentrically to the output shaft, arranged as a double planetary gearset, and five switch elements in the form of three clutches and two brakes, whose optional locking, always in pairs, and in each case, determines the various gear transmissions between the drive shaft and the output shaft. Herein the transmission consists of a wheel set series and two power modes so that, by selective pair gearing, six forward gears are obtained from the five switching elements.

Herein within the first power mode of the two clutches, it is required for transmission of the torque from the wheel set series to the two elements of the double planetary gearset. They are essentially arranged behind the wheel set series in direction of the double planetary gearset in the direction of the power flux. An additional clutch is provided in the second power mode that loosely connects this one with a further element of the double planetary gearset. The clutches are thus arranged in such a manner that the inside plate carrier forms the output.

Furthermore, a compact multi-step reduction gear transmission of the planetary type construction, especially well-known for motor vehicles, which displays two planetary wheel sets and a wheel set series as well as three clutches and two brakes, is known from U.S. Pat. No. 6,139,463. This well-known multi-stage gear has two clutches C1 and C-3 for torque transfer at the first power mode from the wheel set series to both of the planetary wheel sets. In this way, the outer plate beam and/or the cylinder and/or piston and the compensation side of the clutch C-3 are linked with a first brake B-1. In addition, the interior plate beam of the third clutch C-3 is connected to the cylinder and/or piston and the compensation side of the first clutch C-1, whereby the interior plate beam of the first clutch C-1 is arranged at the output side and is connected with a sun wheel of the third planetary wheel set.

Furthermore, a multi-step reduction gear transmission is also known from the patent holder of the DE 199 49 507 A1, which is equipped with two wheel set series on the drive shaft that cannot be switched and which, on the output side, produce two revolutions which, in addition to the revolutions of the drive shaft, act selectively upon a switchable dual planetary wheel set that operates by way of selectively shutting off the used switch elements in order to switch from one gear of the two operating switch elements into the next following higher or lower gear of the two just engaged switch elements so that only one switching element has to be switched on or off.

DE 199 12 480 A1 is well known for its automatic, adjustable, motor vehicle transmission with three access planet sets as well as three brakes and two clutches for switching six forward and a reverse gear and with a drive as well as an output shaft. The automatic, adjustable, motor vehicle transmission is constructed in such a manner that the drive shaft is connected directly to the sun wheel of the second planetary set and that the drive shaft is linked across the first clutch to the sun wheel of the first planetary set and/or can be connected across the second clutch with the fixed link of the first planetary set. Additionally or alternatively, the sun wheel of the first planetary set can be connected across the first brake with the housing the transmission and/or the fixed link of the first planetary set across the second brake with the housing and/or the sun wheel of the third planetary set across the third brake with the housing.

Moreover a multi-stage gear automatic transmission is well-known from the DE 102 13 820 A1 patent, includes an input path T1 of a first speed ratio; an input path T2 which has a larger speed ratio this input path T1; a planetary gearset of four elements, wherein the four elements are a first element, a second element, a third element, and a fourth element following an order of elements on a speed diagram; a clutch C-2 transmitting a rotation from the input path T2 to the first element S3; a clutch C-1 transmitting the rotation from the input path T2 to the fourth element S2; a clutch C-4 transmitting a rotation from the input path T1 to the first element; a clutch C-3 transmitting the rotation from the input path T1 to the second element C3; a brake B-1 engaging the fourth element; a brake B-2 engaging the second element and an output member coupled with the third element R3.

Within the scope of DE 101 15 983 A1, the patent holder describes a multi-stage reduction transmission that has a drive shaft, which is connected with a wheel set series by an output shaft that is linked to a lower switching set that has no more than seven switching elements through which selective switching through at least seven forward gears without parallel shifting is possible. The wheel set series is constructed of a planetary gearset series or maximally two non-switchable planetary wheel sets that are linked to the first connection planetary wheel set wherein the lower switching set is designed as a two-bar, four-shaft transmission with two adjustable lower switch planetary wheel sets and displays four idle shafts. The first idle shaft of this two-bar four-shaft transmission is connected to the first switch element, the second idle shaft in the second and third switch elements, the third idle shaft to the fourth and fifth switching elements and the fourth idle shaft is connected to the drive shaft. According to this invention, for a multi-stage, reduction gear with a total of six shifting elements it is suggested additionally connect the third idle shaft or the first idle shaft of the lower switch set to a sixth switching element. The invention suggests that the third idle shaft of the multi-stage reduction gear transmission with a total of seven switch elements should be additionally connected with a sixth switching element D' and that the first idle shaft should be connected with a seventh switch element.

furthermore, the Applicant describes the multi-stage reduction gear transmission with at least seven gears within the scope of the DE 101 15 987 patent. In addition to the drive shaft and the output shaft, this transmission consists of a non-switchable wheel set series and an adjustable connecting lower switch set in the form of a two-bar, four-shaft transmission. The wheel set series consists of a first planetary gearset which, in addition to the feed number of revolutions of the drive shaft, provides a second number of revolutions that can be selectively switched to a lower switch set. The lower switch set consists of two adjustable planetary gearsets which, together with the six switch elements, provide for at least seven gears, wherein two power mode, output passages are created. Thus with each switching operation in a favorable manner, continuous group shifting is avoided. Furthermore, a 9-gear-multi-stage, reduction gear is well-known from DE 29 36 969; it comprises eight shifting elements and four wheel sets.

The automatic adjustable car transmissions in planetary design methods are generally described from the state of the art technological point of view and are subject to a continuous development and improvement process. In this way, such transmissions should display a sufficient number of forward gears as well as a reverse gear to provide for a well-suited gear reduction for motor vehicles displaying an overall flexibility as well as a favorable progressive ratio. In addition, these transmissions should make a high takeoff reduction possible in a forward gear and maintain a direct gear operation and also be suited for passenger cars, as well as commercial vehicles. In addition, these transmissions should require a lower manufacturing cost and especially a small number of shifting elements and to avoid double shifting during sequential gear shifts so that with shifts in a defined gear group only one element at a time will be shifted.

This invention is basically intended as a multi-stage reduction gear transmission of the above described type in which the manufacturing cost is optimized and, furthermore, the effectiveness of the main driving gears regarding losses due to drag and toothing. In addition, in case of the multi-stage reduction gears, according to this invention, small moments which have an effect on the shift elements and the planetary sets, as well as on the shaft rotations, shift elements and planetary sets are kept as low as possible. Moreover, the number of gears, as well as the gear flexibility, should be increased so that the seven forward gears and at least one reverse gear are used to an advantage. Also according to the invention, the transmission should be suitable for any vehicle; in the transmission should be suitable for vehicles of any type of design, especially in a front transverse arrangement.

SUMMARY OF THE INVENTION

According to this invention, a multi-stage reduction gear transmission is suggested in a planetary design method, which displays a drive shaft and an output shaft that are arranged in a housing. In addition, there are at least three planetary sets, at least seven rotating shafts, as well as at least six shift elements comprising brakes and clutches, intended by their selective intervention to effect different speed ratios between the drive shaft and the output shaft so that, preferably, seven forward gears and at least one reverse gear can be used.

Herewith, the drive shaft is constantly linked with the sun wheel of the first planetary set and linked across a clutch; first clutch can be connected with a shaft, which is connected to the bar of the second and the bar of the third planetary set. The output shaft is constantly connected with the ring gear of the second planetary set and the ring gear of the third planetary set. Furthermore, another one is intended to be constantly connected with the bar of the first planetary set linked shaft which, on the one hand, can be connected across a brake to the housing and, on the other hand, connected across the clutches with two more shafts or can be detachably connected. On the one hand, one of these two shafts is additionally detachably connected across a clutch which is constantly connected with the ring gear of the first planetary set and, on the other hand, this shaft is constantly linked with the sun wheel of the third planetary set. According to this invention, one other shaft is, on the one hand, constantly connected with the sun wheel of the second planetary set and, on the other hand, across a brake to the housing.

As a result of the arrangement of the multi-stage reduction gear transmission, according to this invention, the transmission are especially suitable for passenger cars. There is also a significant increase in overall flexibility of the multi-stage reduction gear transmission, which results in an improvement of the travel comfort and a significant reduction in fuel consumption.

In addition, the multi-stage reduction gear transmission, according to this invention, the manufacturing costs would be substantially reduced by the small number of shifting elements, preferably two brakes and four clutches. In a favorable manner, it is possible with the multi-stage reduction gear transmission to perform a start up with a hydrodynamic converter, an external start up clutch or other suitable external start up elements. It would also be conceivable to make the start up the process with a start up element integration in a transmission. Preferably a shift element is suitable for operations in a first forward gear and in the reverse gear.

Beyond that, according to invention of the multi-stage reduction gear transmission, the main driving gears work efficiently with regard to the drag and toothing losses.

Moreover, there are small moments in the shift elements and in the planetary sets of the multi-stage reduction gear transmission whereby the multi-stage reduction gear wear is advantageously reduced. Furthermore, due to these small moments, an accordingly small dimensioning is made possible, whereby the required manufacturing space and the corresponding costs are reduced. In addition, there are also a smaller number of shaft revolutions, the shift elements are the planetary sets.

Also, according to this invention, the transmission is conceived in such a manner that adaptability is made possible for different drive string arrangements both in regards to the power flux direction and space.

BRIEF DESCRIPTION OF THE DRAWINGS

The invention will now be described, by way of example, with reference to the accompanying drawings in which:

FIG. 1 is a schematic representation of a preferred embodiment of a multi-stage reduction gear transmission having a front transverse design;

FIG. 2 is a schematic representative of another preferred embodiment of a multistage reduction gear, according to invention;

FIG. 3 is a shift schematic for the multi-stage reduction gear transmission, according to the invention, in accordance with FIG. 1 and FIG. 2;

DETAILED DESCRIPTION OF THE INVENTION

Figure 8:
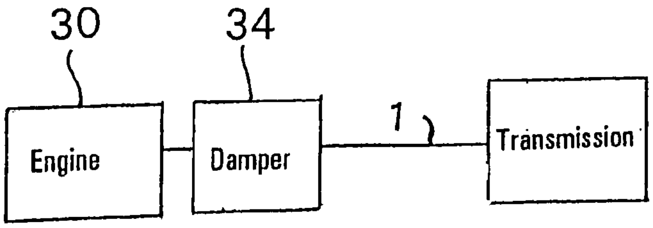
FIG. 8 is a diagrammatic view of an embodiment of the multi-step reduction gear transmission having an engine and a damper together with the drive shaft and the output shaft 2 provided on the same side of the transmission housing (G)

FIG. 1 shows a multi-step reduction gear transmission, according to the invention, having a drive shaft 1 (An) and an output shaft 2 (Ab), arranged in a housing G as shown in FIG. 8. Three planetary sets P1, P2, P3 are provided for. Here the first planetary set P1 and the third planetary set P3 are preferably displayed as plus- planetary sets; the second planetary set P2 is shown, in accordance with the invention, as a minus- planetary set and the first planetary set P1 preferably serves as reduction planetary set.

As evident in FIG. 1, only six shift elements, i.e., two brakes 03, 04 and four clutches 16, 36, 37 and 57 are intended.

With these gear changing elements, a selective shifting of seven forward gears and a reverse gear is possible. The multi-step reduction gear transmission exhibits a total of seven rotating shafts, i.e., the shafts 1, 2, 3, 4, 5, 6 and 7.

According to the invention of the multi-step reduction gear transmission, according to FIG. 1, it is intended that the drive takes place via shaft 1, which is constantly linked with the sun wheel of the first planetary set P1 and across the clutch 16 with the shaft 6, which can be connected with the bar of the second and of the third planetary set P2, P3.

The output takes place via shaft 2, which is constantly connected with the ring gear of the second planetary set P2 and the ring gear of the third planetary set P3. Also a shaft 3 is provided for that is constantly connected with the bar of the first planetary set P1 which, on the one hand, can be coupled across a brake 03 to the housing G and, on the other hand, detachably connected across clutches 36, 37 with the shafts 6 and/or 7. Here, the clutches 36 and 37 are preferably arranged next to each other. In the context of a preferential design, they show a common external plate carrier; the external plate carriers are arranged on the drive side. On the one hand, the shaft 7 is detachably linked across the clutch 57 with the shaft 5, which is connected constantly with the ring gear of the first planetary set P1; on the other hand, shaft 7 is constantly connected with the sun wheel of the third planetary set P3.

Moreover shaft 4 is, on the one hand, constantly connected with the sun wheel of the second planetary set and, on the other hand, it can be connected across the brake 04 to the housing G.

The spatial arrangement of the shift elements can be arbitrary and is only limited by the dimensions and the external design.

The example of a transmission, according to the invention, shown in FIG. 2 differs from the example in FIG. 1 in that the second and third planetary sets P2, P3 are designed together for and/or reduced to a Ravigneaux set with a common bar and a common ring gear. This construction, compared to the previously described one, has the advantage that fewer structural elements are needed.

FIG. 3, for example, represents a shifting schematic of a multi-step reduction gear transmission, according to FIG. 1 and FIG. 2 of the invention. For each gear, three shift elements are closed. The shifting schematic illustrates the respective gear changes i in individual gears and the corresponding shifts $\phi$. Moreover, it can be observed from the gear change schematic that in sequential shifting manner, double shifting and/or group shifting can be avoided, since two adjacent gears use two shift elements jointly. The fifth gear is preferably designed as a direct gear, whereby the progressive ratios in the higher gears are small.

The first gear is a result of stepping on the brakes 02 and 03 and the clutch 57; the second gear as a result from locking the brake 04 and clutches 36 and 57, and the third gear as a result of using brake 04 and clutches 37 and 57. Moreover, the fourth gear is a result of using brake 04 and the clutches 16 and 37; the fifth gear from using clutches 16, 37 and 57; the sixth gear from using brake 03 and the clutches 16 and 57, and the seventh gear from using brake 03 and the clutches 16 and 37. As evident from the gear schematic, the reverse gear is a result of using the brake 03 and the clutches 36 and 57.

In accordance with the invention, a start up with an integrated shift element (IAK) is possible. Clutch 57 is particularly suitable for this task since it is needed in the first gear and in the reverse gear without a direction of rotation reversal.

According to this invention, different gear ratios can result from the same transmission schematic according to the gear shift logic resulting in different gear shifts so that a usage and/or vehicle-specific variations are possible.

Figure 10:
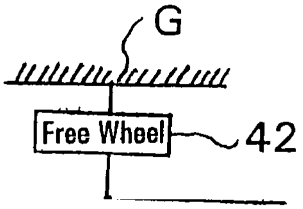
FIG. 10 is a diagrammatic view of an embodiment of the multi-step reduction gear transmission having a free wheel.

It is also possible to design idle runs (e.g., a free wheel or free wheels) 42 at each suitable position of the multi-step reduction gear, for example, between a shaft and the housing G, as shown in FIG. 10, or in order to link two shafts, if necessary.

Figure 4:
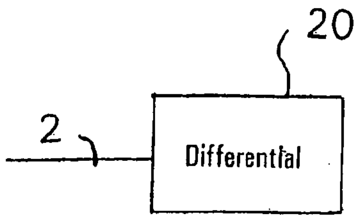
FIG. 4 is a diagrammatic view of an embodiment of the multi-step reduction gear transmission having a differential.

One can arrange an axle differential and/or a distributor differential 20 on the drive shaft or output shaft side according to invention, as shown in FIG. 4.

Figure 5:
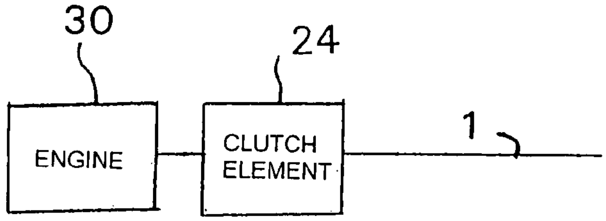
FIG. 5 is a diagrammatic view of an embodiment of the multi-step reduction gear transmission with a clutch element and an engine.
Figure 6:
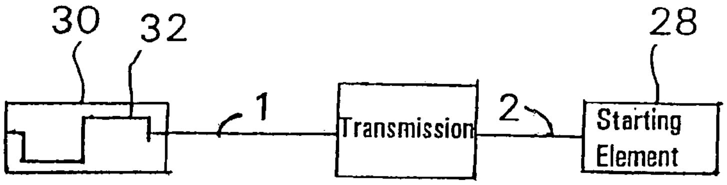
FIG. 6 is a diagrammatic view of an embodiment of the multi-step reduction gear transmission having the transmission located between a starting element and an engine.
Figure 7:
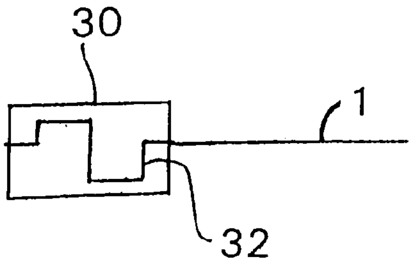
FIG. 7 is a diagrammatic view of an embodiment of the multi-step reduction gear transmission for a front-transverse installation with an engine.

Within the scope of the beneficial further development, as shown in FIG. 5, the drive shaft 1 can be separated from an engine drive or an engine 30 by way of an additional clutch element 24 are required, wherein the clutch element can be used as a hydrodynamic converter, a hydraulic clutch, a dry start up clutch, a wet start up clutch, a magnetic powder clutch or a centrifugal force clutch. It is also possible, as shown in FIG. 6, to arrange such start-up (starting) element 28 in a power flux direction behind the transmission wherein, in this case, the drive shaft 1 is constantly connected with the crankshaft 32 of the engine 30.

In addition, the multi-step reduction gear, according to this invention and shown in FIG. 8, makes an arrangement of a torsion vibration damper 34 possible between the engine 30 and the transmission.

Figure 9:
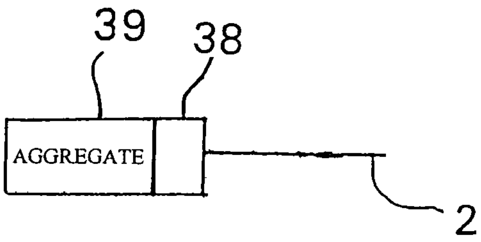
FIG. 9 is a diagrammatic view of an embodiment of the multi-step reduction gear transmission with a power take off for an additional aggregate.
Figure 12:
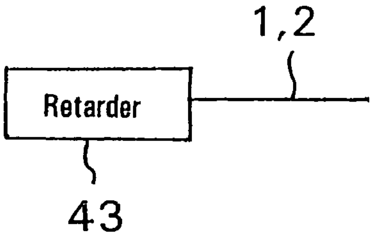
FIG. 12 is a diagrammatic view of the multi-step reduction gear transmission having a retarder.

In the context of an additional design of the invention (not shown here) as shown in FIG. 12, a wear-free brake can be arranged on each drive shaft 1 or the output shaft 2, e.g., a hydraulic or electrical retarder 43 or a similar device, which is especially important for the use in commercial vehicles. Moreover, as shown in FIG. 9, additional aggregate(s) 39 and an auxillary power take-off 38 can be installed on each shaft, preferably on the drive shaft 1 or the output shaft 2.

The used shift elements can be displayed as bearing shifting clutches or brakes. In particular, actuated clutches or brakes, e.g., plate clutches, band brakes and/or cone clutches, can be used. Additionally, interlocking brakes and/or clutches, i.e., synchronizations or claw clutches may also be used as shift elements.

Figure 11:
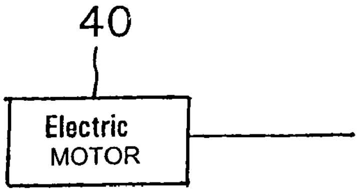
FIG. 11 is a diagrammatic view of an embodiment of the multi-step reduction gear transmission with an electric motor.

As shown in FIG. 11, a further advantage of the multi-step reduction gear consists of the fact that an electric motor 40 can be installed on each shaft as a generator and/or as an additional electric drive motor.

Of course each constructive design, specifically each spatial arrangement of the planetary sets and shift elements as such, as well as to each other, becomes technically meaningful to the extent that under the protective scope of the given claims, it does not influence the function of the transmission, as it is stated in those claims, even when these designs are not explicitly represented in the Figures or in the description.

Reference numerals
1 Shaft
2 Shaft
3 Shaft
4 Shaft
5 Shaft
6 Shaft
7 Shaft
03 Brake
04 Brake
16 Clutch
20 Differential
24 Addition clutch element
28 Start-up (starting) element
30 Engine
32 Crankshaft
34 Damper
36 Clutch
37 Clutch
38 Auxiliary power take-off
39 Additional aggregates
40 Electric motor
42 Idle runs (free wheels)
43 Retarder
57 Clutch
P1 Planetary set
P2 Planetary set
P3 Planetary set
An Propulsion
Ab Powder take-off
i Transmission
ϕ Progressive ratio
G Housing

The invention claimed is:

1. A multi-step reduction gear transmission of planetary construction, for a motor vehicle, comprising:

a drive shaft (1) and a power take-off shaft (2), are arranged in a housing (G), first, second and third planetary sets (P1, P2, P3), at least seven rotating shafts (1, 2, 3, 4, 5, 6, 7), including the drive shaft (1) and the take-off shaft (2), as well as at least six shift elements (03 and 04, 16, 36, 37, 57), including brakes (03, 04) and clutches (16, 36, 37, 57) whose selective engagement results in various transmission relationships between the drive shaft (1) and the power take-off shaft (2) so that seven forward gears and one reverse gear can be achieved, the drive shaft (1) is constantly connected with a sun wheel of the first planetary set (P1) and is connected by a first clutch (16) to a sixth shaft (6), which is connected with a carrier of the second planetary set (P2) and a carrier of the third planetary set (P3), the power take-off shaft (2) is constantly connected with a ring gear of the second planetary set (P2) and a ring gear of the third planetary set (P3), a carrier of the first planetary set (P1) is constantly connected to a third shaft (3) and the carrier of the first planetary set (P1) is detachably connected, by a first brake (03), to the housing (G) and detachably connected, by a second clutch (36), to a sixth shaft (6) and, by a third clutch (37), to a seventh shaft (7), the seventh shaft (7) is constantly connected to a sun gear of the third planetary set (P3) and is detachably connected by a fourth clutch (57) to a fifth shaft (5) which is constantly connected to a ring gear of the first planetary set (P1), and a fourth shaft (4) is constantly connected to a sun gear of the second planetary set (P2) and is detachably coupled by a second brake (04) to the housing (G).

2. The multi-step reduction gear transmission according to claim 1, wherein the second and the third clutches (36, 37) are arranged adjacent one another.

3. The multi-step reduction gear transmission according to claim 1, wherein the second and the third clutches (36, 37) have a common external plate carrier.

4. The multi-step reduction gear transmission according to claim 3, wherein the external plate carrier of the second and the third clutches (36, 37) is on a drive side of the multi-step reduction gear transmission.

5. The multi-step reduction gear transmission according to claim 1, wherein the second planetary set (P2) is a minus planetary set and the first planetary set (P1) and the third planetary set (P3) are plus planetary sets.

6. The multi-step reduction gear transmission according to claim 1, wherein the second and third planetary sets (P2, P3) form a Ravigneaux set with a common carrier and a common ring gear.

7. The multi-step reduction gear transmission according to claim 1, wherein a first gear results from activating the first and the second brakes (03, 04) and the fourth clutch (57); a second gear results from activating the second brake (04) and the second and the fourth clutches (36, 57); a third gear results from activating the second brake (04) and the third and the fourth clutches (37, 57); a fourth gear results from activating the second brake (04) and the first and the third clutches (16, 37); a fifth gear results from activating the first, the third and the fourth clutches (16, 37, 57); a sixth gear results from activating the first brake (03) and the first and the fourth clutches (16, 57); a seventh gear results from activating the first brake (03) and the first and the third clutches (16, 37).

8. The multi-step reduction gear transmission according to claim 1, wherein the reverse gear results from activating the first brake (03) and the second and the fourth clutches (36, 57).

9. The multi-step reduction gear transmission according to claim 1, wherein an idle runs is inserted at a predetermined position.

10. The multi-step reduction gear transmission according to claim 9, wherein the idle run is positioned between at least one of the at least seven rotating shafts (1, 2, 3, 4, 5, 6, 7) and the housing (G).

11. The multi-step reduction gear transmission according to claim 1, wherein a propulsion and the power take-off shaft are provided on a same side of the housing (G).

12. The multi-step reduction gear transmission according to claim 1, wherein one or more of an axle and a distributor differential are arranged on a propulsion side or a power take-off side.

13. The multi-step reduction gear transmission according to claim 1, wherein the drive shaft (1) is detachable from an engine by an additional clutch element.

14. The multi-step reduction gear transmission according to claim 13, wherein the additional clutch element is one of a hydrodynamic converter, a hydraulic clutch, a dry start up clutch, a wet start up clutch, a magnetic powder clutch and a centrifugal power clutch.

15. The multi-step reduction gear transmission according to claim 1, wherein an external starting element is arranged in a power flow direction behind the transmission, the starting element is one of a hydrodynamic converter, a hydraulic clutch, a dry start up clutch, a wet start up clutch, a magnetic powder clutch and a centrifugal power clutch, and the drive shaft (1) is connected with a crankshaft of an engine.

16. The multi-step reduction gear transmission according to claim 1, wherein starting takes place using one of the at least six shaft elements, and the drive shaft (1) is constantly connected to a crankshaft of the engine.

17. The multi-step reduction gear transmission according to claim 16, wherein during start up, the fourth clutch (57) is used as the one of the at least six shaft elements.

18. The multi-step reduction gear transmission according to claim 1, wherein a torsion oscillation damper is placed between an engine and the transmission.

19. The multi-step reduction gear transmission according to claim 1, wherein a wear-free brake is arranged on each side of the drive and the power take-off shafts.

20. The multi-step reduction gear transmission according to claim 1, wherein an additional aggregate is installed on at least one of the at least seven shafts.

21. The multi-step reduction gear transmission according to claim 20, wherein an auxillary power take-off is installed on one of the drive shaft (1) and the power take-off shaft (2).

22. The multi-step reduction gear transmission according to claim 1, wherein the at least six shift elements are one of bearing shift clutches or bearing shift brakes.

23. The multi-step reduction gear transmission according to claim 22, wherein the at least six shift elements are one or more of plate clutches, band brakes and cone clutches may be installed.

24. The multi-step reduction gear transmission according to claim 1, wherein the at least six shift elements are one of interlocking brakes and interlocking clutches.

25. The multi-step reduction gear transmission according to claim 1, wherein an electric motor is placed on at least one of the seven rotating shafts as one of a generator and an additional drive motor.

* * * * *